United States Patent [19]

Hayashi et al.

[11] Patent Number: 5,584,214

[45] Date of Patent: Dec. 17, 1996

[54] TRANSMISSION HAVING A STATIC, HYDRAULIC CONTINUOUSLY-VARIABLE-SPEED TRANSMISSION MECHANISM

[75] Inventors: Tsutomu Hayashi; Mitsuru Saito; Yoshihiro Yoshida; Hiroyuki Kikuchi; Yoshihiro Nakajima, all of Saitama, Japan

[73] Assignee: Honda Giken Kogyo Kabushiki Kaisha, Tokyo, Japan

[21] Appl. No.: 325,590

[22] Filed: Oct. 19, 1994

[30] Foreign Application Priority Data

Oct. 19, 1993 [JP] Japan .................. 5-260898

[51] Int. Cl.⁶ ........................................ F16H 47/02
[52] U.S. Cl. .................... 74/732.1; 74/606 R; 74/730.1; 91/506
[58] Field of Search ................... 74/730.1, 732.1, 74/606 R; 60/445, 444, 487, 488, 489; 91/506

[56] References Cited

U.S. PATENT DOCUMENTS

| | | | |
|---|---|---|---|
| 2,078,287 | 4/1937 | Seibold | 74/730.1 X |
| 2,687,049 | 8/1954 | Ebert | 74/730.1 X |
| 3,453,904 | 7/1969 | Dangauthier | 74/732.1 X |
| 3,981,374 | 9/1976 | Johns, Jr. | 180/248 X |
| 4,373,597 | 2/1983 | Itatani et al. | 74/730.1 X |
| 4,616,478 | 10/1986 | Jensen | 74/606 R X |
| 4,846,046 | 7/1989 | Kanai et al. | 91/506 |
| 4,916,901 | 4/1990 | Hayashi et al. | 60/489 |
| 4,944,154 | 7/1990 | Kawahara et al. | 60/488 |
| 5,038,634 | 8/1991 | Matsuto et al. | 74/730.1 |
| 5,072,587 | 12/1991 | Ikejiri | 60/488 |

FOREIGN PATENT DOCUMENTS

| | | | |
|---|---|---|---|
| 1-210657 | 8/1989 | Japan | 74/730.1 |
| 2-138573 | 5/1990 | Japan | 74/730.1 |
| 3-92658 | 4/1991 | Japan | 74/730.1 |
| 4-203554 | 7/1992 | Japan . | |

*Primary Examiner*—Charles A. Marmor
*Assistant Examiner*—Nathan O. Jensen
*Attorney, Agent, or Firm*—Birch, Stewart, Kolasch & Birch, LLP

[57] ABSTRACT

A transmission with a static, hydraulic continuously-variable-speed transmission mechanism comprising a hydraulic circuit having a closed circuit, a hydraulic pump connected on the crankshaft of an engine, and a hydraulic motor having a motor output shaft coaxial with the axis of rotation of the hydraulic pump, and contained in a casing with its axis extended in parallel to that of the crankshaft. The static, hydraulic continuously-variable-speed transmission mechanism has a small construction and has an increased degree of freedom of selection of speed change ratio. An output shaft, i.e., the final output shaft of a transmission is supported for rotation on a casing with its axis extended in parallel to that of a static, hydraulic continuously-variable-speed transmission mechanism. A motor output shaft and the output shaft can be interlocked by a reduction mechanism.

18 Claims, 10 Drawing Sheets

TRANSMISSION HAVING A STATIC, HYDRAULIC CONTINUOUSLY-VARIABLE-SPEED TRANSMISSION MECHANISM

BACKGROUND OF THE INVENTION

1. Field of the Invention

The present invention relates to a transmission comprising a hydraulic pump connected to the crankshaft of an engine, a hydraulic motor having a motor output shaft coaxial with the hydraulic pump and connected to the hydraulic pump by a closed circuit, and a static, hydraulic continuously-variable-speed transmission mechanism contained in a casing with its axis in parallel to the crankshaft.

2. Description of Background Art

A transmission similar to the instant transmission is disclosed in, for example, Japanese Patent Laid-open (Kokai) No. 4-203554.

In the transmission disclosed in Japanese Patent Laid-open (Kokai) No. 4-203554, the output shaft of a hydraulic motor included in a static, hydraulic continuously-variable-speed transmission mechanism serves as the output shaft of the transmission. Therefore, the static, hydraulic continuously-variable-speed transmission mechanism must have a large torque capacity to provide the transmission with a large transmission gear ratio and, consequently, the static, hydraulic continuously-variable-speed transmission mechanism inevitably has a large size. If the transmission is provided with a static, hydraulic continuously-variable-speed transmission having a small torque capacity, the transmission gear ratio of the transmission is variable in a narrow range of transmission gear ratio.

SUMMARY AND OBJECTS OF THE INVENTION

The present invention has been made in view of such a problem and it is therefore an object of the present invention to provide a transmission provided with a static, hydraulic continuously-variable-speed transmission mechanism having a comparatively small size, and having a transmission gear ratio variable in a comparatively wide range of transmission gear ratio.

With the foregoing object in view, the output shaft of the transmission is supported for rotation in parallel to the axis of a static, hydraulic continuously-variable-speed transmission mechanism on a casing, and a motor output shaft is connected through a reduction mechanism to the output shaft.

The transmission of the present invention comprises, in addition to the components of the transmission stated above, a neutral shift mechanism capable of interconnecting the output shaft and the reduction mechanism and of disconnecting the output shaft and the reduction mechanism from each other. The neutral shaft mechanism is mounted on the output shaft.

The transmission of the present invention comprises, in addition to the components of the transmission stated above, a cover for covering a generator connected to one end of a crankshaft projecting from the casing. The covers attached to the casing supporting the crankshaft of an engine and contains a static hydraulic continuously-variable-speed transmission mechanism, and an electric motor for varying the capacity of a variable displacement hydraulic motor.

The transmission of the present invention also comprises a cylinder block coaxially containing the pump cylinder of a hydraulic pump and the motor cylinder of a hydraulic motor and provided with an annular inner passage and an annular outer passage concentric with the annular inner passage. A movable member included in a clutch valve is capable of connecting the inner passage and the outer passage and of disconnecting the inner passage and the outer passage from each other. The movable member is slidably fitted in the cylinder block so as to extend coaxially with a motor output shaft. A first check valve is provided between a supply passage connected to a supply pump and formed in the casing and the inner passage and a second check valve is provided between the supply passage and the outer passage. A pressure regulating valve opens when the pressure prevailing in the outer passage increases beyond a fixed level to enable part of the working fluid to flow from the outer passage into the inner passage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
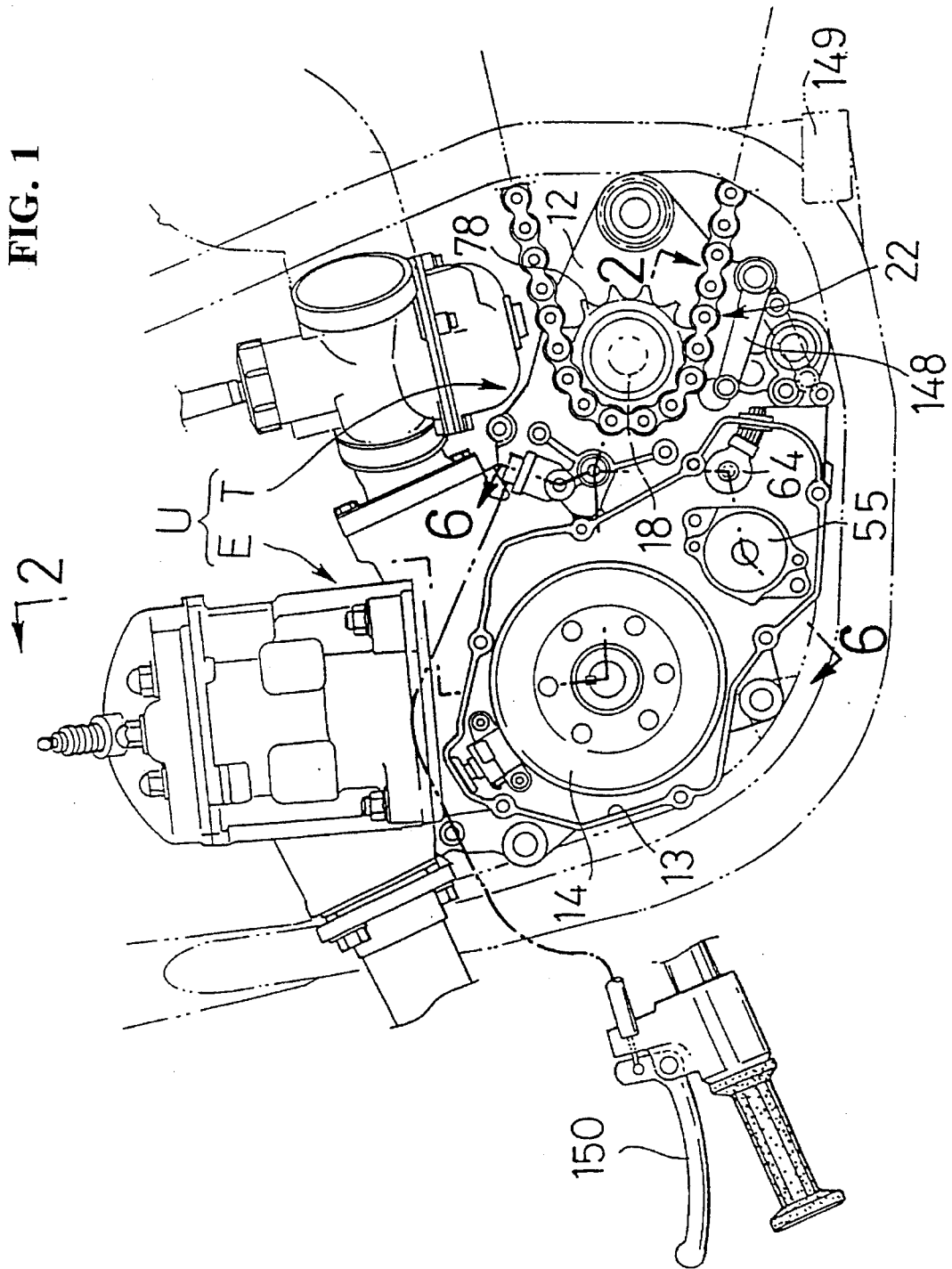
FIG. 1 is a side view of a power unit for a motorcycle.
Figure 2:
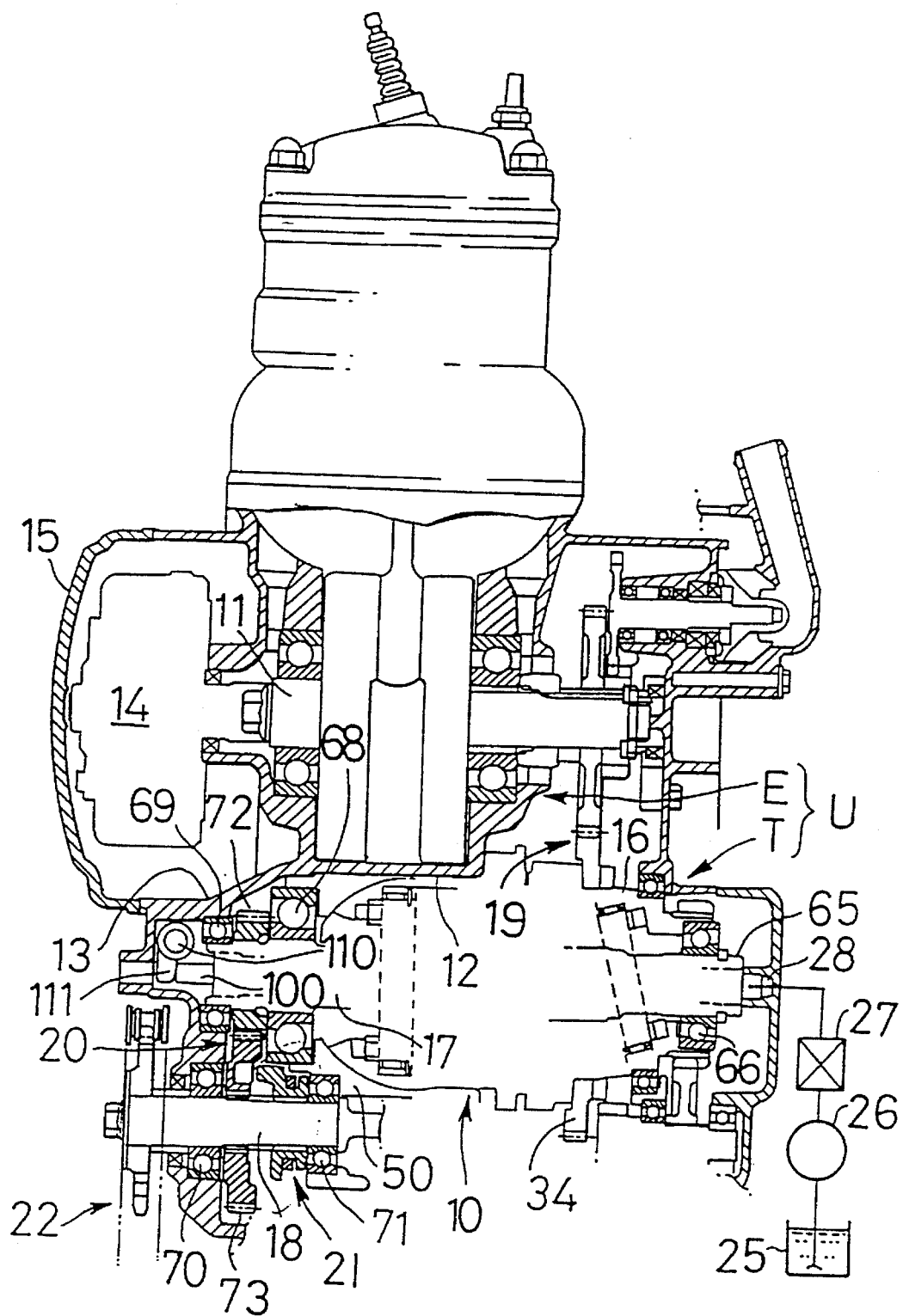
FIG. 2 is a sectional view taken on line 2—2 in FIG. 1.

Referring to FIGS. 1 and 2, the power unit U of a motorcycle comprises an engine E, and a transmission T provided with a static, hydraulic continuously-variable-speed transmission mechanism 10. The crankshaft 11 of the engine E is supported on a casing 12, and the static, hydraulic continuously-variable-speed transmission mechanism 10 is contained in the casing 12. The casing 12 has, on its one side, a housing wall defining a hollow 13 into which one end of a crankshaft 11 projects from the casing 12. A generator 14 contained in the hollow 13 is connected to the end of the crankshaft 11 projecting into the hollow 13. A cover 15 is attached to the housing wall of the casing 12 to close the hollow 13 so as to cover the generator 14.

The transmission T has the static, hydraulic continuously-variable-speed transmission mechanism 10 contained in the casing 12 with its hollow input shaft 16 and a motor output shaft 17 in parallel to the crankshaft 11. An output shaft 18 is journaled on the casing 12 in parallel to the axis of the static, hydraulic continuously-variable-speed transmission mechanism 10. The crankshaft 11 is interlocked through a primary reduction mechanism 19 with the hollow input shaft 16, the motor output shaft 17 is interlocked through a secondary reduction mechanism 20 and a neutral shift mechanism 21 with the output shaft 18, and the output shaft 18 is connected to the rear wheel of a motorcycle, not shown, by a final reduction mechanism 22.

Figure 3:
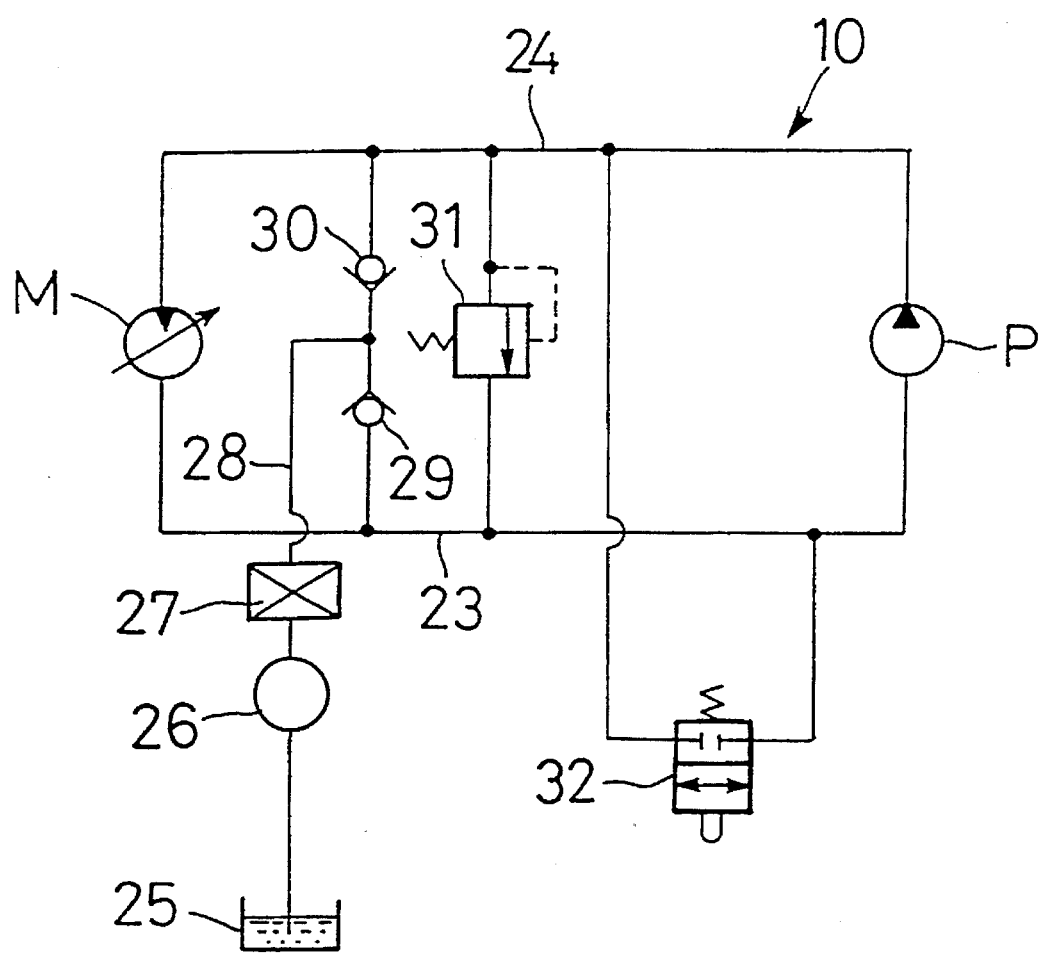
FIG. 3 is a circuit diagram of the hydraulic system of a static, hydraulic continuously-variable-speed transmission mechanism.

Referring to FIG. 3, the static, hydraulic continuously-variable-speed transmission mechanism 10 includes a closed hydraulic circuit with a fixed displacement swash plate type hydraulic pump P and a variable displacement swash plate type hydraulic motor M. An inner passage 23 is also provided which serves as a low-pressure passage during operation under a normal load and as a high-pressure passage during operation under a reverse load. Further, an outer passage 24 is provided which serves as a high-pressure passage during operation under a normal load and as a low-pressure passage during operation under a reverse load.

An oil sump 25, a supply pump 26 for pumping up the working fluid from the oil sump 25, and a supply passage 28 connected through a filter 27 to the supply pump 26 are proved in the transmission mechanism 10. A first check valve 29 connects the supply passage 28 to the inner passage 23. A second check valve 30 connects the supply passage 28 to the outer passage 24. A pressure regulating valve 31 opens to allow part of the working fluid flowing through the outer passage 24 to flow into the inner passage 23 when the pressure within the outer passage 24 increases beyond a fixed level, connecting the inner passage 23 and the outer passage 24. A clutch valve 32 is provided which operates according to the operation of the clutch. The valve 32 is connected to the inner passage 23 and the outer passage 24. The clutch valve 32 has a clutch on position to disconnect the passages 23 and 24 from each other and a clutch off position to connect the passages 23 and 34.

Figure 4:
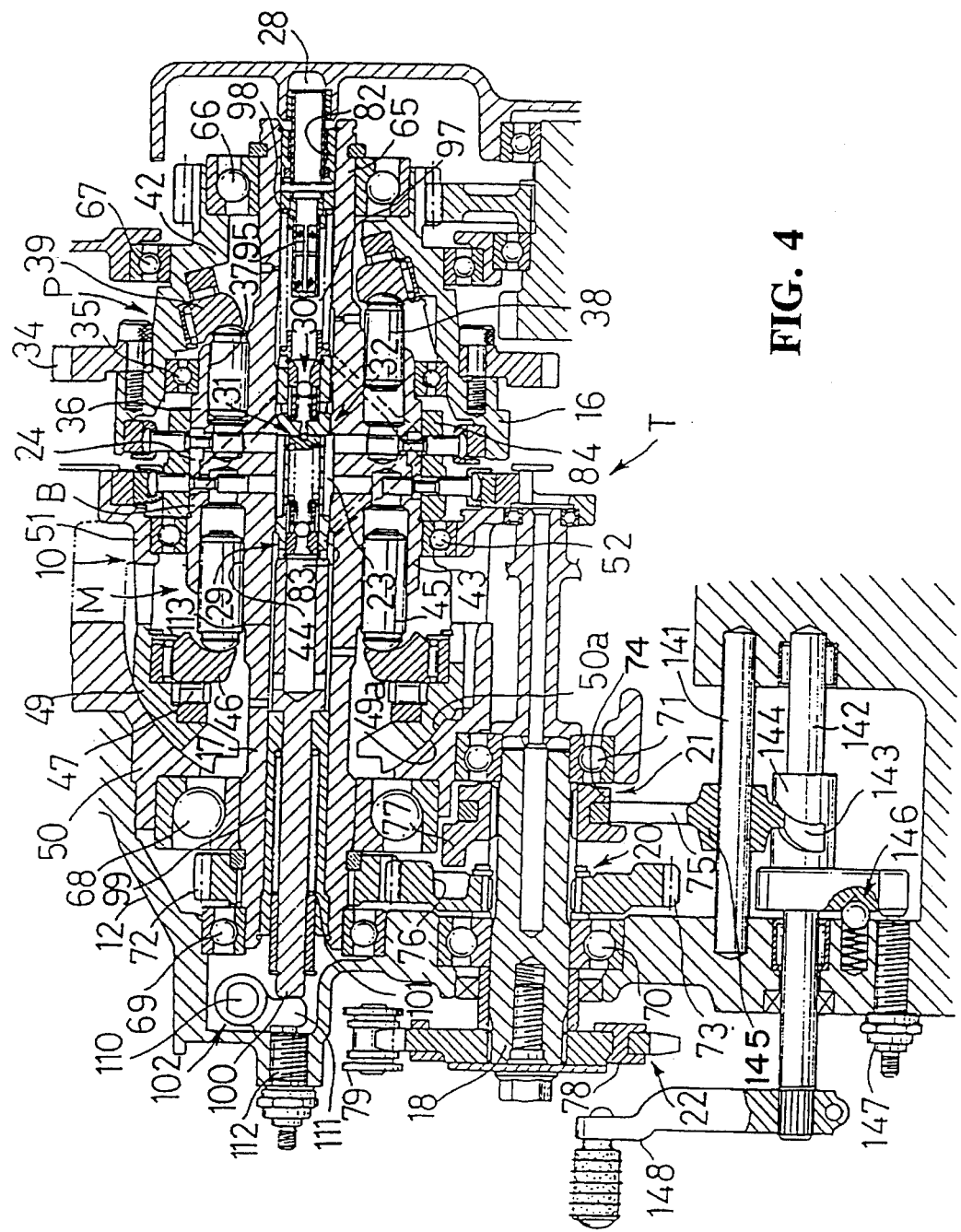
FIG. 4 is a cross-sectional view of the static, hydraulic continuously-variable-speed transmission mechanism.
Figure 5:
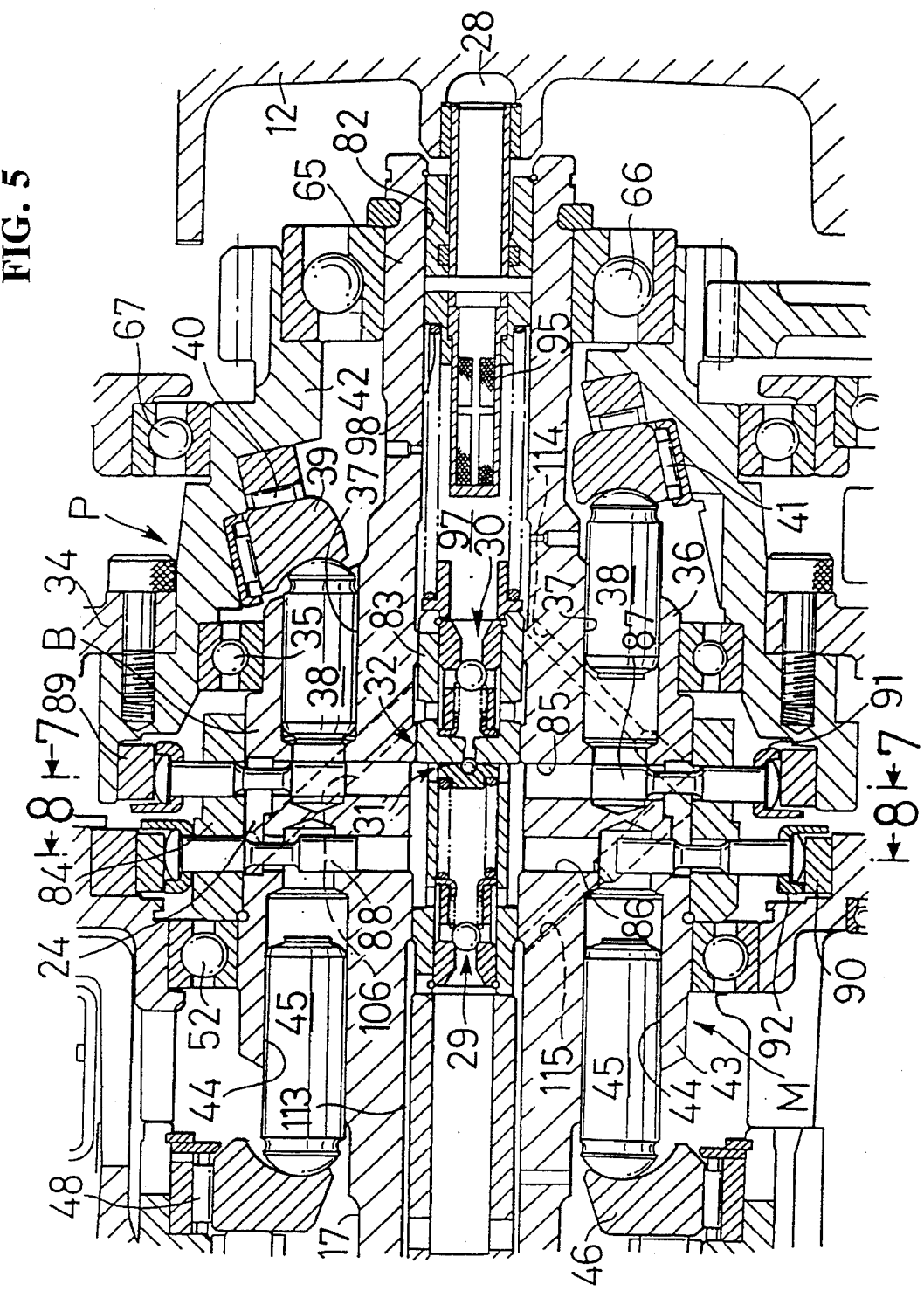
FIG. 5 is an enlarged view of an essential portion in FIG. 4.

The constitution of the static, hydraulic continuously-variable-speed transmission mechanism 10 will now be described in detail. Referring to FIGS. 4 and 5, the swash plate type hydraulic pump P includes the hollow input shaft 16 holding the output sprocket 34 of the primary reduction mechanism 19. A pump cylinder 36 is rotatably supported relative to the hollow input shaft 16 in a ball bearing 35 fitted in the hollow input shaft 16. A plurality of pump plungers 38 are slidably fitted in an odd number of pump cylinder bores 37 formed in the pump cylinder 36 and arranged on a circle around the axis of rotation of the pump cylinder 36. A pump swash plate 39 is disposed with its front surface in contact with the outer ends of the pump plungers 38.

A pump swash plate holder 42 is integrally formed with the hollow input shaft 16 to hold the pump swash plate 39 by means of a thrust bearing 40 and a radial bearing 41. The pump swash plate 39 is held inclined relative to the axis of the pump cylinder 36 about an imaginary trunnion axis, not shown, perpendicular to the axis of the pump cylinder 36. When the hollow input shaft 16 rotates, the pump swash plate 39 reciprocates the plungers 38 for alternately sucking and discharging.

Figure 6:
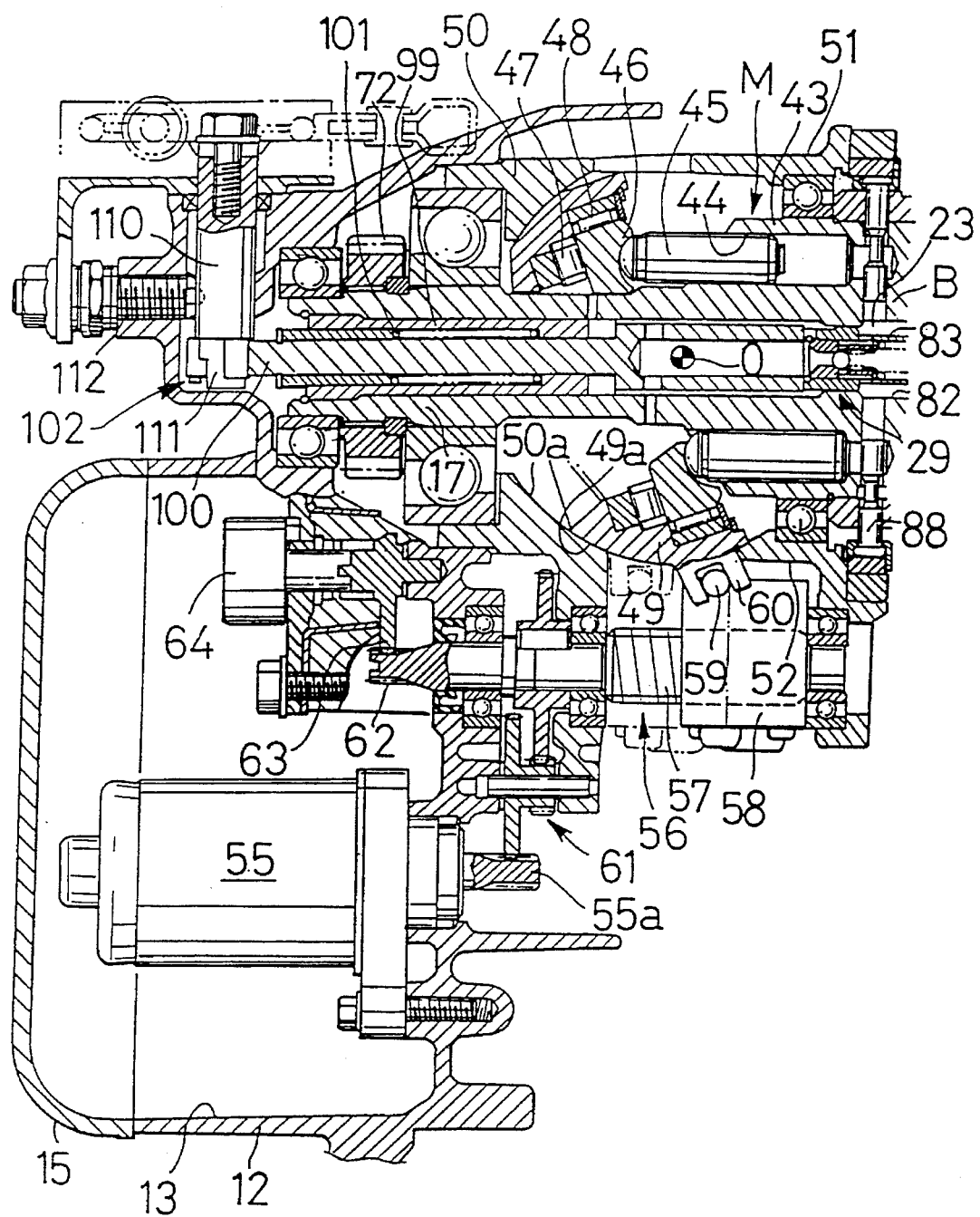
FIG. 6 is a sectional view taken on line 6—6 in FIG. 1.

Referring further to FIG. 6, the hydraulic motor M has a motor cylinder 43 disposed coaxially with and on the left side, as viewed in FIG. 4, of the pump cylinder 36. Motor plungers 45 are slidably fitted in motor cylinder bores 44 formed in the motor cylinder 43 around the axis of rotation of the motor cylinder 43. A motor swash plate 46 is disposed with its front surface in contact with the outer ends of the motor plungers 45. A motor swash plate holder 49 holds the motor swash plate 46 by means of a thrust bearing 47 and a radial bearing 48. A motor swash plate anchor 50 backs up the motor swash plate holder 49.

The number of the motor cylinder bores 44 formed in the motor cylinder 43 is equal to that of the pump cylinder bores 37 of the hydraulic pump P. The respective contact surfaces 49a and 50a of the motor swash plate holder 49 and the motor swash plate anchor 50 are spherical surfaces on a sphere having its center at the intersection point of the axis of the motor cylinder 43 and the trunnion axis 0. The motor swash plate holder 49 is supported on the motor swash plate anchor 50 so as to be turnable about the trunnion axis 0 relative to the motor swash plate anchor 50.

A cylinder holder 51 is connected to one end of the motor swash plate anchor 50 on the side of the motor cylinder 43 and is put on a ball bearing 52 on the outer circumference of the motor cylinder 43.

The motor swash plate holder 49 is turned about the trunnion axis 0 by a ball-and-screw mechanism 56 driven by a pulse motor 55, i.e., an electric motor. The motor swash plate 46 is then turned between an upright position in which the motor swash plate 46 is perpendicular to the axis of the motor cylinder 43 and a maximum inclined position in which the motor swash plate 46 is inclined at an angle relative to the axis of the motor cylinder 43. When inclined at such an angle relative to the axis of the motor cylinder 43, the motor swash plate 46 makes the motor plungers 45 reciprocate for expansion and contraction strokes as the motor cylinder 43 rotates.

The axis of the ball-and-screw mechanism 56 is parallel to the hydraulic motor M. The ball-and-screw mechanism 56 comprises a screw shaft 57 supported for rotation on the casing 12 and the motor swash plate anchor 50, and a nut 58 screwed on the screw shaft 57. A pin 59 projecting from the nut 58 in parallel to the trunnion axis 0 is in engagement with a substantially U-shaped recess 60 formed in the motor swash plate holder 49. The nut 58 moves along the screw shaft 57 according to the rotation of the screw shaft 57 to turn the motor swash plate holder 49 together with the motor swash plate 46 about the trunnion axis 0.

The pulse (electric) motor 55 is set in the hollow 13 of the casing 12 and fixed to the outer surface of the side wall of the casing 12. The output shaft 55a of the pulse motor 55 projects into the interior of the casing 12 in parallel to the screw shaft 57. The pulse motor 55 is covered together with the generator 14 with the cover 15. The output shaft 55a of the pulse motor 55 is interlocked with the screw shaft 57 by a gear train 61 to drive the screw shaft 57 for rotation.

The outer end of the screw shaft 57 penetrates the casing 12 and projects into the hollow 13. A sector gear 63 engaging a gear 62 mounted on the outer end of the screw shaft 57 is supported for rotation on the casing 12. A potentiometer 64 is set in the hollow 13 and is attached to the side wall of the casing 12 to measure the position of the nut 58 of the ball-and-screw mechanism 56 corresponding to the inclination of the motor swash plate 46. The potentiometer 64 is covered, together with the generator 14 and the pulse motor 55, with the cover 15.

The pump cylinder 36 and the motor cylinder 43 are integrally formed in a cylinder block B. The cylinder block B is integrally provided with a motor output shaft 17 and a pump shaft 65, which are coaxial with each other. The motor shaft 17 projects from the center of the surface of the motor cylinder 43 of the motor block B, facing the motor swash plate 46, and the pump shaft 65 projects from the center of the surface of the pump cylinder 36 of the cylinder block B, facing the pump swash plate 39. The motor output shaft 17 and the pump shaft 65 are coaxial with each other.

The pump shaft 65 extends through the pump swash plate 39 and the pump swash plate holder 42. One end of the pump swash plate holder 42 is supported on an angular contact ball bearing 66 put on the pump shaft 65. The pump swash plate holder 42 is supported in a ball bearing 67 fitted in the casing 12.

The motor output shaft 17 extends through the motor swash plate 46, the motor swash plate holder 49 and the motor swash plate anchor 50. The motor output shaft 17 extends through and is supported in an angular contact ball bearing 68 fitted in the motor swash plate anchor 50. The motor output shaft 17 is supported at its outer end in a ball bearing 69 fitted in the side wall of the casing 12. The output shaft 18 extends in parallel to the motor output shaft 17 and through the casing 12, and is supported at its outer end in a ball bearing 70 fitted in the side wall of the casing 12 and at its inner end in a ball bearing 71 fitted in the swash plate anchor 50.

The secondary reduction mechanism 20 comprises a driving pinion 72 fixedly mounted on the motor output shaft 17 at a position between the angular contact ball bearing 68 and the ball bearing 69, and a driven gear 73 engaging the driving pinion 72 and mounted on the output shaft 18 for rotation relative to the output shaft 18.

The neutral shift mechanism 21 comprises a sleeve 74 mounted on the output shaft 18 so as to be axially movable within a predetermined range and not to be rotatable relative to the output shaft 18, and a shift fork 75 engaging the sleeve 74 to move the sleeve 74 along the axis of the output shaft 18. The driven gear 73 is provided with a recess 76 in its surface facing the sleeve 74, and the sleeve 74 is provided with a projection 77 capable of engaging the recess 76 in its surface facing the driven gear 73. When the sleeve 74 is shifted toward the driven gear 73 to bring the projection 77 into engagement with the recess 76, the secondary reduction mechanism 20 and the output shaft 18 are interlocked. When the sleeve 74 is shifted away from the driven gear 73 to disengage the projection 77 from the recess 76, the secondary reduction mechanism 20 is disconnected from the output shaft 18.

The shift fork 75 is slidably supported at its base end on a shaft 141 extended in parallel to the output shaft 17 and fixedly supported on the casing 12 so as to be slidable along the axis of the shaft 141. A rotary shaft 142 is extended in parallel to the shaft 141 and is supported for rotation on the casing 12. A cam block 144 provided with a cam groove 143 is fixedly mounted on the rotary shaft 142. A cam follower 145 engaging the cam groove 143 projects from the base end of the shift fork 75. When the cam block 144 is turned, the cam groove 143 drives the cam follower 145 to make the shift fork 75 move the sleeve 74 between a connecting position and a disconnecting position. In the connecting position, the projection 77 engages the recess 76 to interlock the secondary reduction mechanism 20 and the output shaft 18. In the disconnecting position, the projection 77 is disengaged from the recess 76 to disconnect the secondary reduction mechanism 20 from the output shaft 18.

A click mechanism 146 is disposed between the cam block 144 and the casing 12 so that the cam block 144 is turned stepwise. A neutral switch 147 is attached to the casing 12 to detect the neutral state of the neutral shaft mechanism 21 through the detection of the angular position of the cam block 144.

A neutral change pedal 148 is fixed at its base end to the outer end of the rotary shaft 141 projecting from the casing 12. As shown in FIG. 1, a foot step 149 for supporting the driver's foot is attached to the casing 12. As also shown in FIG. 1, the neutral change pedal 148 is shifted by the driver's foot supported on the foot step 149 between a neutral position indicated by continuous lines and a drive position indicated by broken lines to thereby operate the neutral shift mechanism 21.

The final reduction mechanism 22 comprises a driving sprocket 78 fixed to the outer end of the output shaft 18 projecting from the casing 12, a driven sprocket (not shown) attached to the rear wheel of the motorcycle, and an endless chain 79 extended between the driving sprocket 78 and the driven sprocket.

Figure 7:
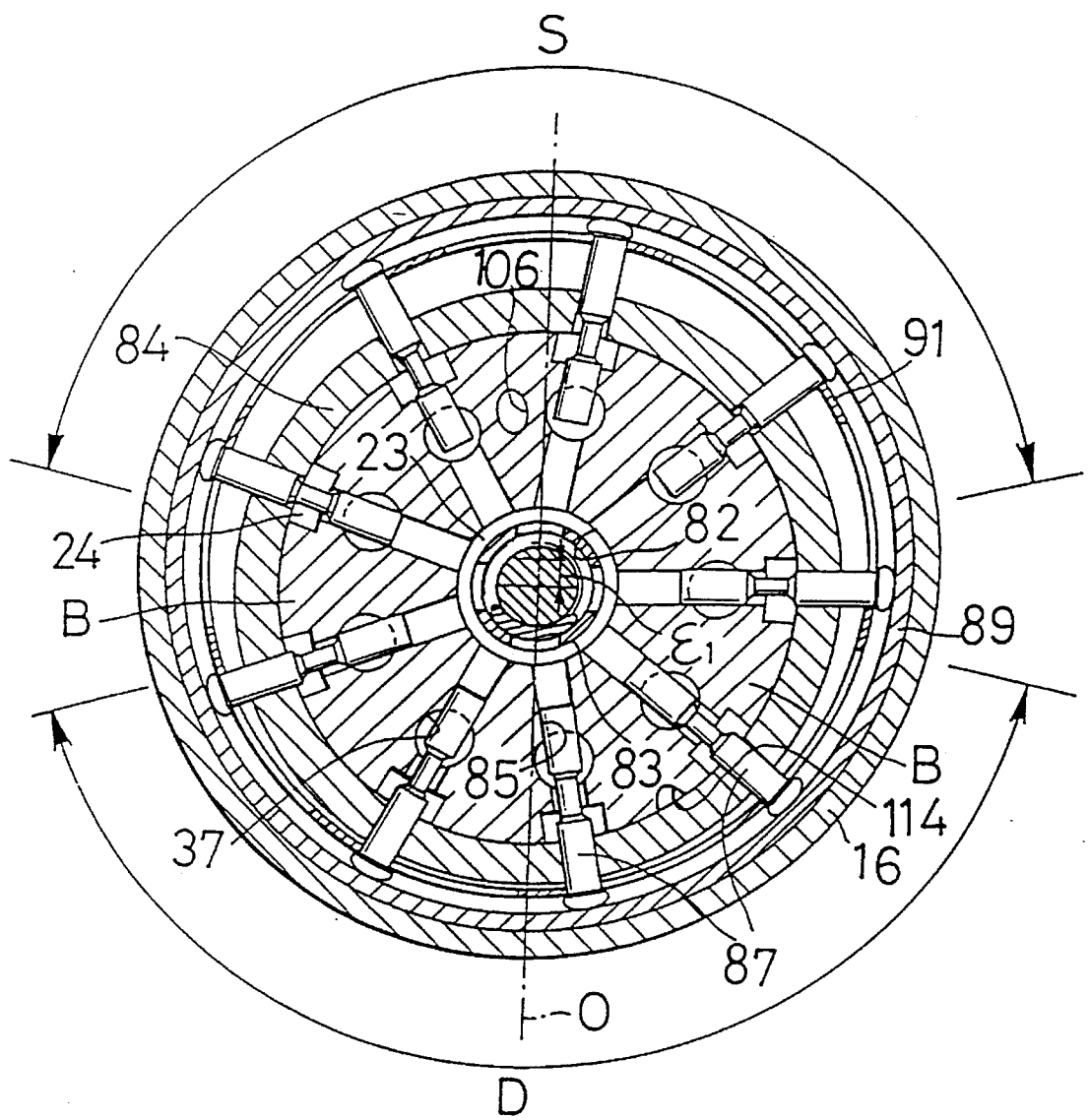
FIG. 7 is a sectional view taken on line 7—7 in FIG. 5.
Figure 8:
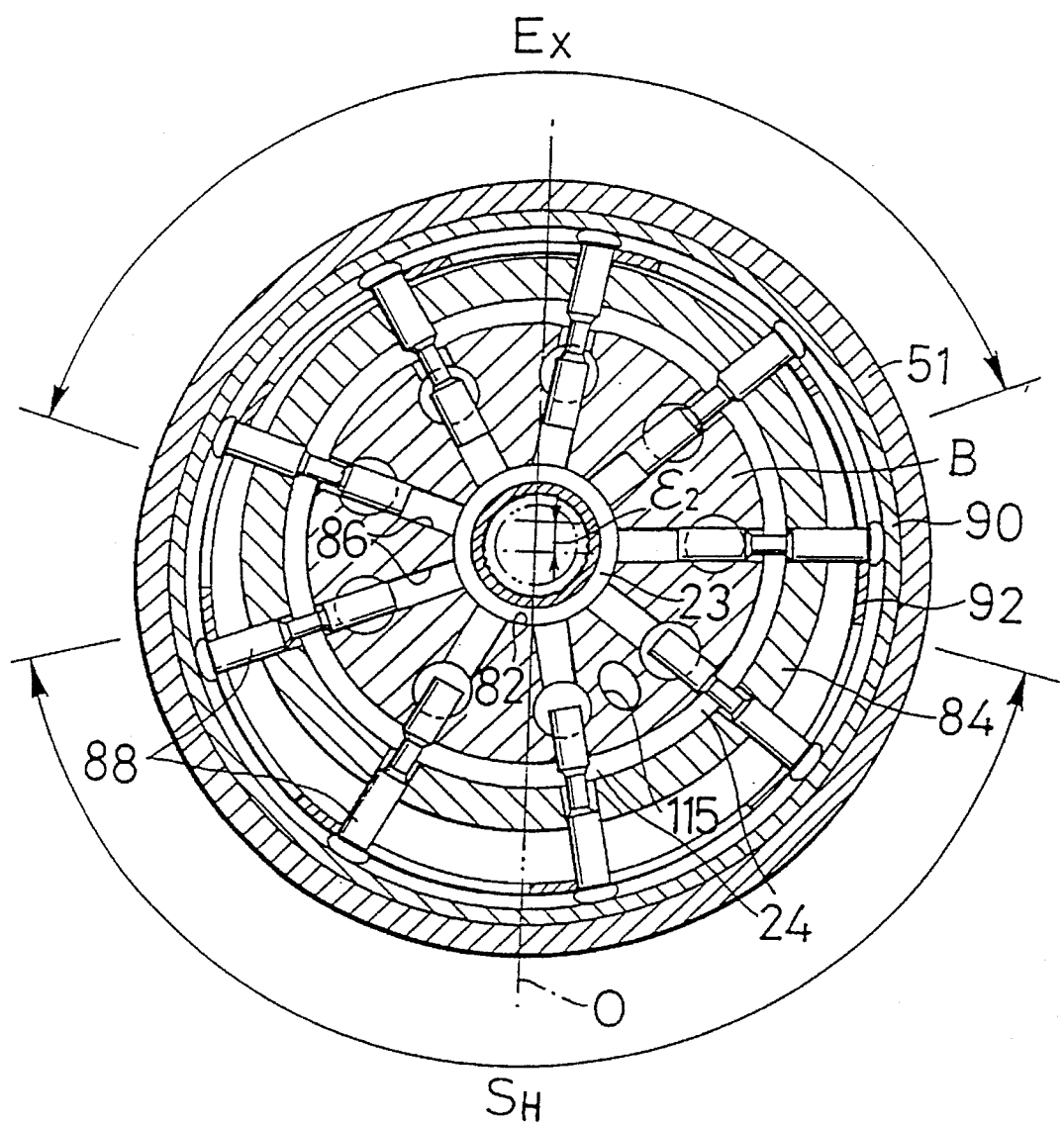
FIG. 8 is a sectional view taken on line 8—8 in FIG. 5.

Referring further to FIGS. 7 and 8, the annular passage 23 having its center on the axis of rotation of the cylinder block B and the annular outer passage 24 having its center on the axis of rotation of the cylinder block B are formed concentrically in the cylinder block B between the pump cylinder bores 37 of the pump cylinder 36 and the motor cylinder bores 44 of the motor cylinder 43. The cylinder block B is provided coaxially with a through hole 82 having one end opening on the side of the pump shaft 65 and the other end opening into the end of the motor output shaft 17. A cylindrical spool 83, i.e., a movable member of the clutch valve 32, is slidably fitted in the through hole 82. The circumference of the through hole 82 and the spool 83 forms the annular inner passage 23. A ring 84 is fixed to the outer circumference of the cylinder block B to define the annular outer passage 24 concentric with the inner passage 23.

Radial first valve holes 85 and radial second valve holes 86 are formed through the annular wall between the inner passage 23 and the outer passage 24 formed between the pump cylinder bores 37 of the pump cylinder 36 and the motor cylinder bores 44 of the motor cylinder 43 in the cylinder block B. The ring 84 defines the outer passage 24. The numbers of the first valve holes 85 and the second valve holes 86 are equal to that of the pump cylinder bores 37. The first valve holes 85 are arranged on the side of the pump cylinder bores 37, and the second valve holes 86 are arranged on the side of the motor cylinder bores 44.

First distribution spools 87 are fitted slidably in the first valve holes 85, respectively, and second distribution spools 88 are fitted slidably in the second valve holes 86, respectively. The outer ends of the first distribution spools 87 are in sliding contact with the inner circumference of a first eccentric ring 89 surrounding the first distribution spools 87. The outer ends of the second distribution spools 88 are in sliding contact with the inner circumference of a second eccentric ring 90 surrounding the second distribution spools 88. A first biasing ring 91 concentric with the first eccentric ring 89 is connected to the outer ends of the first distribution spools 87. A second biasing ring 92 concentric with the second eccentric ring 90 is connected to the outer ends of the second distribution spools 88.

The first eccentric ring 89 is fixed to the hollow input shaft 16 so that the its center is dislocated by a predetermined eccentricity $\epsilon_1$ from the center of the cylinder block B along the trunnion axis 0 as shown in FIG. 7. The second eccentric ring 90 is fixed to the cylinder holder 51 connected to the motor swash plate anchor 50 as shown in FIG. 8 so that its center is dislocated by a predetermined eccentricity $\epsilon_2$ from the center of the cylinder block B along the trunnion axis 0.

The action of the first distribution spools 87 will be described hereinafter. When the hollow input cylinder 16 and the pump cylinder 36, i.e., the cylinder block B, rotate relative to each other, the first distribution spools 87 are reciprocated radially in the first valve ports 85 between an innermost position and an outermost position by the first eccentric ring 89 for a stroke equal to twice the eccentricity $\epsilon_1$.

As shown in FIG. 7, the first distribution spools 87 are moved toward the innermost positions in the discharge range D of the hydraulic pump P to connect the corresponding pump cylinder bores 37 to the outer passage 24 and to disconnect the same from the inner passage 23. Working fluid is thereby forced from the pump cylinder bores 37 into the outer passage 24 by the pump plungers 38 operating for a discharge stroke. The first distribution spools 87 are moved toward the outermost positions in the suction range of the hydraulic pump P to connect the corresponding pump cylinder bores 37 to the inner passage 23 and to disconnect the same from the outer passage 24 to suck in the working fluid from the inner passage 23 into the pump cylinder bores 37 by the pump plungers 38 operating in a suction stroke.

The action of the second distribution spools 88 will be described hereinafter. When the motor cylinder 43, i.e., the cylinder block B is rotated, the second distribution spools 88 are reciprocated radially in the second valve bores 86 between an innermost position and an outermost position by the second eccentric ring 90 for a stroke equal to twice the eccentricity $\epsilon_2$. As shown in FIG. 8, the second distribution spools 88 are moved toward the innermost positions in the expansion range $E_x$ of the hydraulic motor M to connect the corresponding motor cylinder bores 44 to the outer passage 24 and to disconnect the same from the inner passage 23. The high-pressure working fluid is thereby supplied into the motor cylinder bores 44 containing the motor plungers 45. The second distribution spools 88 are moved toward the outermost position in the contraction range $S_H$ of the hydraulic motor M to connect the corresponding motor cylinder bores 44 to the inner passage 23 and to disconnect the same from the outer passage 24. The working fluid is thereby discharged from the motor cylinder bores 44 into the inner passage 23 by the motor plungers 45 operating for a contraction stroke.

Thus, the cylinder block B is rotated by the sum of the reaction torque of the pump swash plate 39 acting on the pump cylinder 36 through the pump plungers 38 operating for a discharge stroke and reaction torque of the motor swash plate 46 acting on the motor cylinder 43 through the motor plunger 45 operating for an expansion stroke. The output torque of the cylinder block B is transmitted through the motor output shaft 17 to the secondary reduction mechanism 20.

The speed change ratio, i.e., the ratio of the speed of the motor output shaft 17 to that of the hollow input shaft 16, is given by the following expression.

(Speed change ratio)=1+(Capacity of the hydraulic motor M)/(Capacity of the hydraulic pump P)

Accordingly, the speed change ratio can be changed from 1 (one) to a necessary speed change ratio by varying the capacity of the hydraulic motor M from zero upward. Since the capacity of the hydraulic motor M is dependent on the stroke of the motor plungers 45, the speed change ratio can be changed continuously from 1 (one) upward by inclining the motor swash plate 46 from its upright position to an inclined position.

Basically cylindrical filter unit 95 is inserted in the through hole 82 formed in the cylinder block B coaxially with the latter at a position on the side of the pump shaft 65. One end of the filter unit 95 projecting from the pump shaft 65 is fitted in an oiltight fashion in the supply passage 28 formed in the casing 12. As shown in FIG. 2, the supply passage 28 is connected through the filter 27 to the supply pump 26. Also inserted in the through hole 82 are the clutch valve 32, the pressure regulating valve 31, the first check valve 29 and the second check valve 29.

Figure 9:
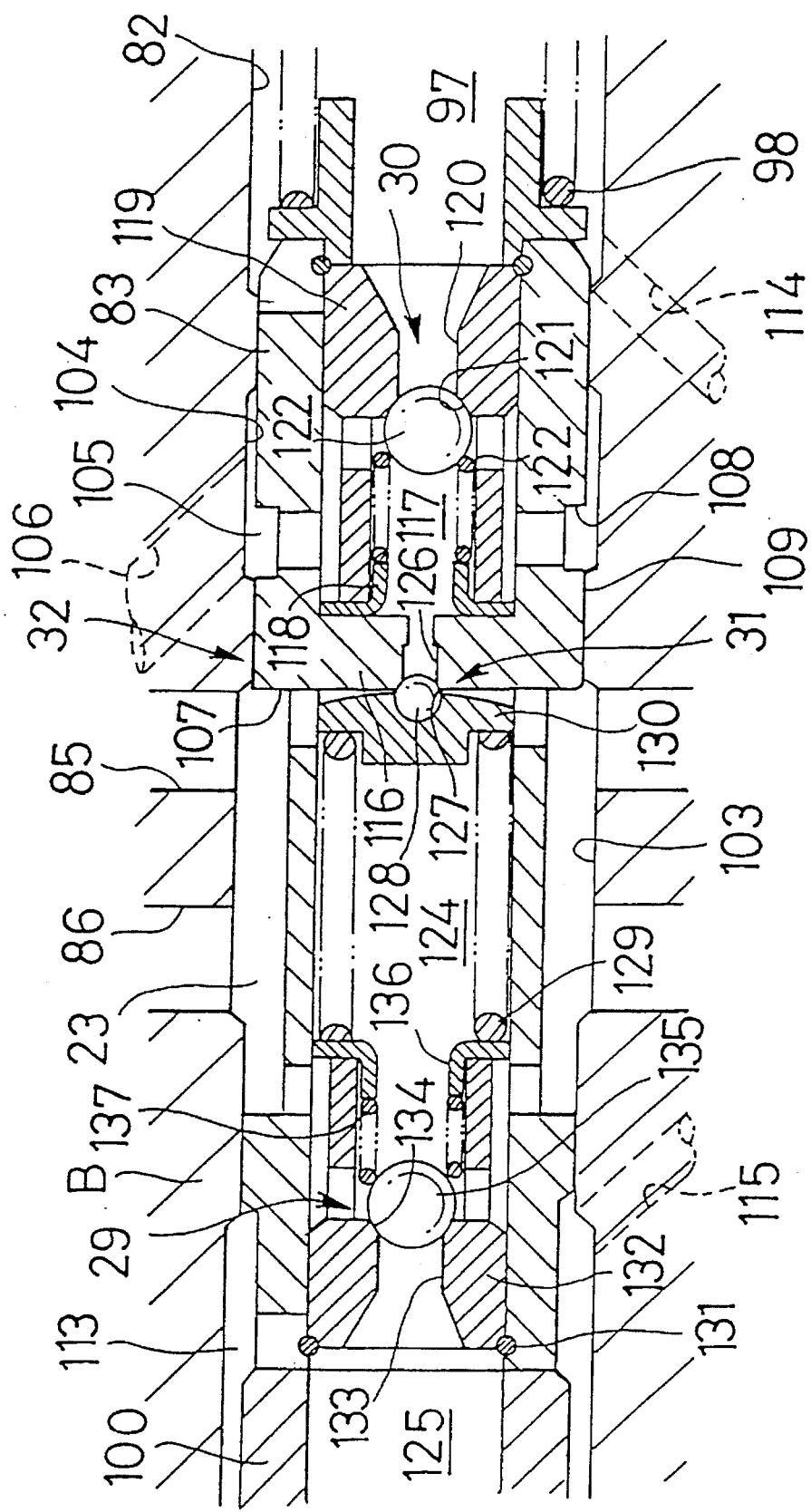
FIG. 9 is an enlarged view of an essential portion in FIG. 5 in a state where a clutch is engaged.

Referring further to FIG. 9, the clutch valve 32 comprises a spool 83 slidably fitted in the through hole 82 so as to define a first supply chamber 97 together with the filter unit 95. A first return spring 98 is compressed between the spool 83 and the filter unit 95. A pressing member 100 is axially slidably fitted in an oiltight fashion in a guide member 99 fixedly fitted in the through hole 82 at a position on the side of the motor output shaft 17 and having an inner end in contact with the spool 83. A resilient second return spring 101 acts in the same direction as the first return spring 98 and is compressed between the guide member 99 and the pressing member 100. The outer end of the pressing member 100 is connected to a driving mechanism 102.

An annular groove 103 to form the annular inner passage 23 connected to all the inner ends of the first valve holes 85 and the second valve holes 86 is formed contiguously with the spool 83 in the circumference of the through hole 82 and the spool 83. An annular groove 104 is formed in the circumference of the through hole 82 at a distance from the annular groove 103 toward the filter unit 95 to form an annular chamber 105 between the circumference of the through hole 82 and the outer circumference of the spool 83. A connecting passage 106 for interconnecting the annular chamber 105 and the outer passage 24 is formed in the cylinder block B. The annular chamber 105 is always communicating with the outer passage 24 through the connecting passage 106.

A first annular groove 107 always connected to the inner passage 23 and a second annular groove 108 always connected to the annular chamber 105 are formed in the outer circumference of the spool 83 on the opposite sides, respectively, of a land 109.

The driving mechanism 102 comprises a rotary shaft 110 supported for rotation on the casing 12 with its axis extended perpendicularly to the axis of the motor output shaft 17. A cam 111 is fixed to the rotary shaft 110 and is in contact with the outer end of the pressing member 100. The rotary shaft 110 is turned by the operation of a clutch lever 150 (FIG. 1). A clutch sensor 112 attached to the casing 12 detects the turning motion of the rotary shaft 110.

Figure 10:
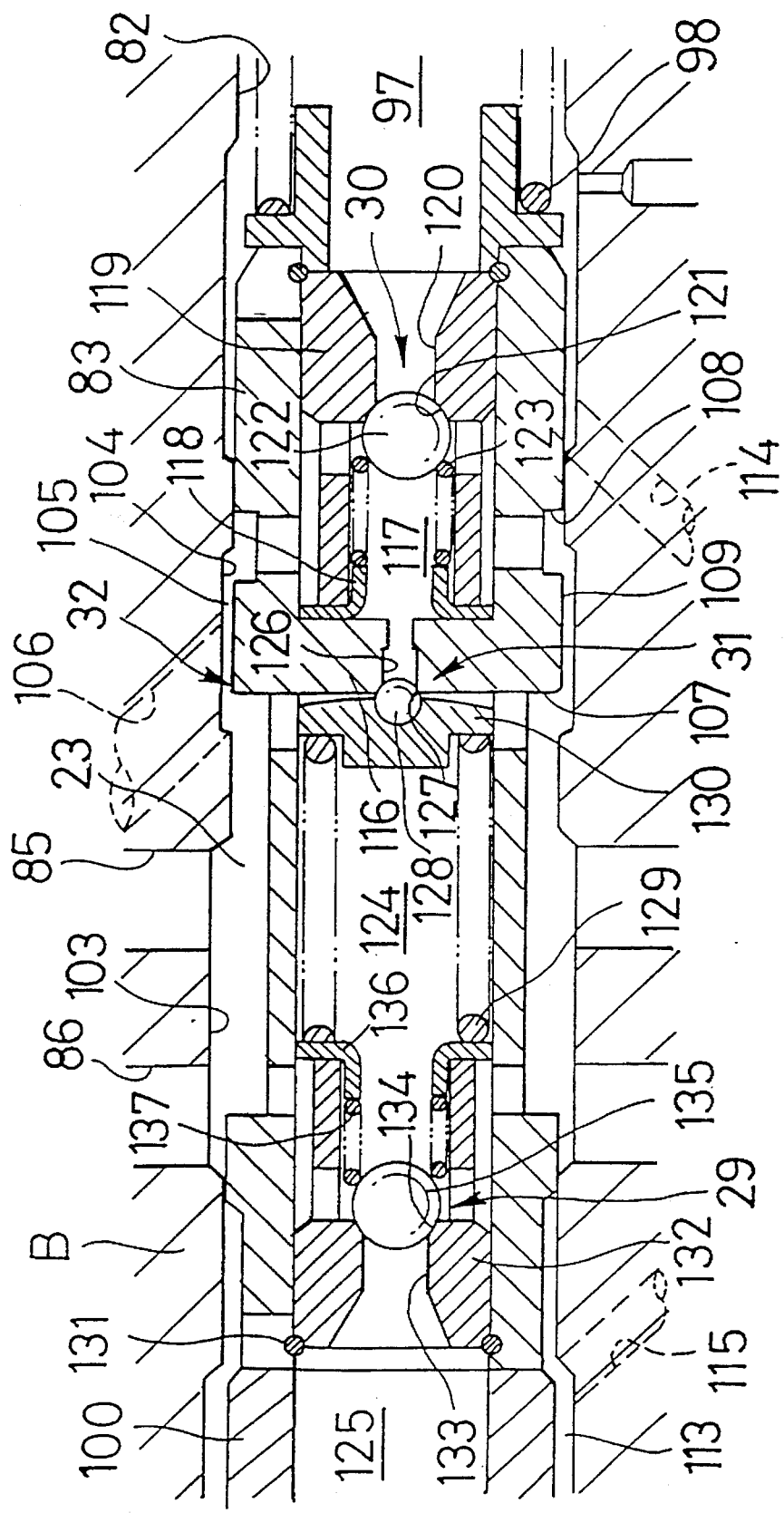
FIG. 10 is a sectional view of a portion corresponding to that shown in FIG. 9 in a state where the clutch is disengaged.

The spool 83 of the clutch valve 32 can be moved by operating the clutch lever 150 to the right, as viewed in FIG. 9, from a clutch-on position to a clutch-off position. In the clutch-on position, the land 109 disconnects the inner passage from the annular chamber 105 communicating with the outer passage 24 with the land 109. In the clutch-off position shown in FIG. 10, the spool 83 allows the inner passage 23 to communicate with the annular chamber 105.

The driving mechanism 102 may be operated by an electric motor instead of being operated by the manually operated clutch lever 150.

The end surface of the spool 83 on the side of the pressing member 100, the end surface of the pressing member 100 on the side of the spool 83, and the circumference of the through hole 82 define an annular second supply chamber 113 communicating with the first supply chamber 97. The first connecting passage 114 opening through the first supply chamber 97 in the outer surface of the cylinder block B, and a second connecting passage 115 opening through the second supply chamber 113 in the outer surface of the cylinder block B are formed in the cylinder block B. The open ends of the first connecting part 114 and the second connecting passage 115 meet at a position on the outer surface of the cylinder block B. The open ends of the first connecting passage 114 and the second connecting passage 115 are closed by the ring 84. Therefore, the first supply chamber 97 communicates with the second supply chamber 113 by means of the first connecting passage 114 and the second connecting passage 115.

A partition wall 116 is formed in the middle portion of the spool 83. The spool 83 is provided with the second check valve 30 on the side of the supply chamber 97 with respect to the land 116. The second check valve 30 comprises a valve casing 119 fixedly fitted in the spool 83, forming a valve chamber 117 always communicating with the annular chamber 105 together with the partition wall 116 and the second check valve 30 and provided with a tapered valve seat 121. A spring seat 118 is pressed against the partition wall 116 by the valve casing 119. A spherical valve element 122 is contained in the valve chamber 117 and seated on the valve seat 121, and a spring 123 is compressed between the valve element 122 and the spring seat 118.

A valve chamber 124 communicating with the inner passage 23 is formed in a portion of the spool 83 on the opposite side of the partition wall 116 with respect to the portion in which the second check valve is fitted. A third supply chamber 125 opening toward the spool 83 is formed in one end of the pressing member 100 on the side of the spool 83. The third supply chamber 125 communicates with the second supply chamber 113.

The pressure regulating valve 31 comprises a spherical valve element 128 contained in the valve chamber 117 and seated on a valve seat 127 formed in the surface of the partition wall 116 on the side of the valve chamber 124 so as to close a valve hole 126 formed in the central portion of the partition wall 116 and connected to the valve chamber 117 of the second check valve 30. A disk-shaped sliding member 130 is slidably fitted in the valve chamber 117 and fixed to the valve element 128. A spring 129 is contained in the valve chamber 124 to seat the valve element 128 on the valve seat 127. A valve casing 132 is fitted in the outer end of the spool 83 on the side of the pressing member 100 and is restrained from coming off the spool 83 by a retaining ring 131 fitted in a groove formed in the inner surface of the spool 83. The spring 129 is compressed between a spring seat 136 resting on the inner end of the valve casing 132 and the sliding member 130.

In the pressure regulating valve 31, the pressure prevailing in the outer passage 24 acts through the valve hole 126 on the valve element 128, and the pressure prevailing in the inner passage 23 acts through the valve chamber 124 on the valve element 128. The difference between the pressures acting in opposite directions on the valve element 128 corresponds to a valve opening force that acts to the left, as viewed in FIGS. 9 and 10. In a normal operating state where the pressure prevailing in the outer passage 24 is lower than a specified level, the resilience of the spring 129 biasing the valve element 128 to a closing position is greater than the valve opening force, so that the valve element 128 is kept seated on the valve seat 127 to disconnect the valve chambers 117 and 124 from each other.

When the pressure prevailing in the outer passage 24 increases beyond the specified level, the valve opening force exceeds the resilience of the spring 129 and, consequently, the sliding member 130 slides compressing the spring 129. The valve element 128 is then separated from the valve seat 127 to open the valve hole 126. Working fluid of an excessively high pressure then flows through the valve hole 126 into the inner passage 23. When the pressure prevailing in the outer passage decreases below the specified level, the valve element 128 is seated again on the valve seat 127 by the resilience of the spring 129. Therefore, the pressure prevailing in the outer passage will not increase excessively during the sharp start and the sharp acceleration of the vehicle.

The first check valve 29 comprises the valve casing 132 fitted in the outer end of the spool 83 on the side of the pressing member 100, restrained from coming off the spool 83 by the retaining ring 131. The valve chamber 124 is defined by the retaining ring 131 and the sliding member 130 of the pressure regulating valve 31. A tapered valve seat 134 is provided on its surface facing the valve chamber 124. A valve hole 133 opens into the third supply chamber 125. A spherical valve element 135 is seated on the valve seat 134 in the valve chamber 124 and a spring 137 is compressed between the spring seat 136 resting on the inner end of the valve casing 132 and the valve element 135.

The operation of the first check valve 29 and the second check valve 30 will be described hereinafter. If the pressure prevailing in the low-pressure inner passage 23 drops below the pressure prevailing in the supply passage 28 due to the leakage of the working fluid from the closed hydraulic circuit including the hydraulic pump P and the hydraulic motor M in a normally loaded operating mode, in which the hydraulic pump P drives the hydraulic motor M, the first check valve 29 opens and the second check valve 30 closes. When the first check valve 29 opens, the working fluid is supplied from the supply passage 28 into the inner passage 23. When the second check valve 30 closes, the flow of the working fluid from the high-pressure outer passage 24 into the supply passage is inhibited. In a reverse loaded operating mode, i.e., an engine-braked operating mode, the hydraulic motor M acts as a hydraulic pump while the hydraulic pump P acts as a hydraulic motor. Consequently, the pressure in the outer passage 24 drops and the pressure in the inner passage 23 increases. Therefore, the second check valve 30 opens to allow the working fluid to flow from the supply passage 28 into the outer passage 24, and the first check valve inhibits the flow of the working fluid from the inner passage into the supply passage 28.

The operation of this embodiment will be described hereinafter. The output shaft 18, i.e., the final output end of the transmission-T, is supported for rotation in parallel to the axis of the static, hydraulic continuously-variable-speed transmission mechanism 10 on the casing 12. The output of the static, hydraulic continuously-variable-speed transmission mechanism 10 is transmitted from the motor output shaft 17 through the secondary reduction gear mechanism 20 to the output shaft 18. Therefore, even if the maximum speed change ratio of the static, hydraulic continuously-variable-speed transmission mechanism 10 is set to a comparatively small ratio, the maximum speed change ratio of the transmission T can be set to a large ratio. Therefore, the degree of freedom of selection of the speed change ratio of the transmission T can be increased even if the static, hydraulic continuously-variable-speed transmission mechanism 10 is designed for a comparatively small torque capacity to form the static, hydraulic continuously-variable-speed transmission mechanism 10 in a small construction.

Since the driving pinion 72 of the secondary reduction mechanism 20 is fixedly mounted on the motor output shaft 17 between the angular contact bearing 68 and the ball bearing 69 supporting the motor output shaft 17 and supported on the casing 12, the reaction force of the secondary reduction mechanism 20 acting on the motor output shaft 17 can be born by the bearings 68 and 69. Accordingly, the bearings 68 and 69 enhance the rigidity of the motor output shaft 17, the diameter of the motor output shaft 17 may be comparatively small, and the motor output shaft 17 is prevented from bending to improve the efficiency.

Since the first check valve 29, the second check valve 30, the pressure regulating valve 31 and the clutch valve 32 are arranged collectively in the central through hole 82 of the cylinder block B, and the first check valve 29, the second check valve 30 and the pressure regulating valve 31 are contained in the spool 83 of the clutch valve 32, the clutch mechanism has a simple construction. The first check valve 29, the second check valve 30 and the pressure regulating valve 31 can be removed together with the clutch valve 32 from the static, hydraulic continuously-variable-speed transmission mechanism 10. Also the static, hydraulic continuously-variable-speed transmission 10 has a simple construction.

Since the output shaft 18 and the secondary reduction mechanism 20 are interlocked by the neutral shift mechanism 21 to engage the static, hydraulic continuously-variable-speed transmission mechanism and the output shaft 18 and to disengage the same from each other, the connection of the power unit U to the rear wheel for power transmission and the disconnection of the power unit U from the rear wheel can be carried out with a satisfactory response. Variation of the rotation of the crankshaft 11 is not transmitted, and the operating noise of the neutral shift mechanism 21 can be reduced to the least possible extent.

Since the pulse motor 55 for changing the capacity of the hydraulic motor M, and the potentiometer 64 are disposed in the space formed on the casing 12, containing the generator 14 connected to the crankshaft 11 and covered with the cover 15, waterproof measures for the pulse (electric) motor 55 and the potentiometer 64 are unnecessary. If the pulse motor 55 and the potentiometer 64 are arranged otherwise, such waterproofing would be necessary. Wiring harnesses connected to the generator 14, the pulse motor 55 and the potentiometer 64 can be bound together and may be comparatively short.

To summarize the instant invention, the output shaft 18, i.e., the final output end, of the transmission T is supported for rotation in parallel to the axis of the static, hydraulic continuously-variable-speed transmission mechanism 10 on the casing 12. The motor output shaft 17 and the output shaft 18 are interlocked by the reduction mechanism 20. The maximum speed change ratio of the transmission T can be set to a large ratio even if the speed change ratio of the static, hydraulic continuously-variable-speed transmission mechanism 10 is set to a comparatively small ratio. The torque capacity of the static, hydraulic continuously-variable-speed transmission mechanism 10 may be comparatively small to minimize the size of the static, hydraulic continuously-variable-speed transmission mechanism. The degree of freedom of selection of the speed change ratio of the transmission T can also be increased.

Further according to the invention, the neutral shift mechanism 21 is combined with the output shaft 18 to engage the output shaft 18 and the reduction gear mechanism and to disconnect the same from each other. Therefore, the transmission T can be disconnected from the rear wheel with a satisfactory response. Operating noise of the neutral shift mechanism 21 can be suppressed to the least possible extent.

In the transmission of the instant invention, the cover 15 is attached to the casing 12 containing the crankshaft 11 of the engine E and the static, hydraulic continuously-variable-speed transmission mechanism 10 to thereby cover the generator 14 connected to one end of the crankshaft 11 projecting outside from the casing 12. The electric motor 55 for changing the capacity of the variable displacement hydraulic motor is also covered with the cover 15. Any waterproof measures specially needed for the electric motor 55 are unnecessary, and the wiring harnesses may be comparatively short.

According to the invention, the cylinder block B coaxially comprises the pump cylinder 36 of the hydraulic pump P and the motor cylinder 43 of the hydraulic motor M and is provided with the annular inner passage 23 and the annular outer passage 24 concentric with the annular inner passage 23. The movable member 83 is included in the clutch valve 32 and is capable of connecting and disconnecting the inner passage 23 and the outer passage 24. The clutch valve 32 is slidably fitted in the cylinder block B so as to extend coaxially with the motor output shaft. The first check valve 29 is provided between the casing 12 and the inner passage 23, the second check valve 30 is provided between the supply passage 28 and the outer passage 24, and a pressure regulating valve 31 is provided. This pressure regulating valve 31, will open when the pressure prevailing in the outer passage 24 increases a fixed level to enable part of the working fluid to flow from the outer passage 24 into the inner passage 23. Therefore, the clutch structure is simplified. The first check valve 29, the second check valve 30 and the pressure regulating valve 31 can be removed together with the clutch valve 32. The static, hydraulic continuously-variable-speed transmission mechanism 10 therefore has a simple construction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for an engine having a crankshaft, the transmission comprising:

a static, hydraulic continuously-variable-speed transmission mechanism disposed with a longitudinal axis thereof generally parallel to the crankshaft, the hydraulic continuously-variable-speed transmission including a hydraulic pump connected to the crankshaft of the engine and a hydraulic motor having a motor output shaft coaxial with an axis of rotation of the hydraulic pump and connected to the hydraulic pump by a closed circuit;

a casing containing the static, hydraulic continuously-variable-speed transmission mechanism, an output shaft of the transmission being rotatably supported on the casing generally parallel to the longitudinal axis of the static, hydraulic continuously-variable-speed transmission mechanism;

a reduction gear mechanism for interconnecting the motor output shaft and the transmission output shaft; and a cover and a second motor, the cover covering a generator connected to one end of the crankshaft projecting from the casing, the cover being attached to the casing supporting the crankshaft of the engine and containing the static, hydraulic continuously-variable-speed transmission mechanism, the second motor varying capacity of the hydraulic motor, the hydraulic motor being a variable displacement hydraulic motor and being covered with the cover.

2. The transmission according to claim 1, further comprising a neutral shift mechanism for engaging the output shaft of the transmission and the reduction mechanism and for disengaging the output shaft of the transmission and the reduction mechanism, the neutral shift mechanism being mounted on the output shaft of the transmission.

3. The transmission according to claim 2, wherein the neutral shift mechanism further comprises a sleeve and a shift fork, the sleeve being mounted on the output shaft of the transmission, the sleeve being axially movable within a predetermined range and being non-rotatable relative to the output shaft of the transmission, the shift fork engaging the sleeve to move the sleeve along an axis of the output shaft of the transmission and being slidable generally parallel to the axis of the output shaft of the transmission, movement of the sleeve by the shift fork connects and disconnects the output shaft of the transmission and the reduction mechanism.

4. The transmission according to claim 1, wherein the second motor is an electric motor.

5. The transmission according to claim 1, further comprising a potentiometer, the potentiometer and the second motor being disposed within the casing and being covered by the cover.

6. The transmission according to claim 5, wherein the second motor drives a ball-and-screw mechanism, the ball-and-screw mechanism comprises a screw shaft supported for rotation on the casing and a nut screwed on the screw shaft, the potentiometer measures a position of the nut.

7. The transmission according to claim 6, wherein the hydraulic motor has a motor cylinder and has motor plungers slidably fitted in cylinder bores formed in the motor cylinder, a motor swash plate contacting outer ends of the motor plungers, the motor swash plate being rotated by the ball-and-screw mechanism between an upright position and inclined positions, the motor swash plate being generally perpendicular to an axis of the motor cylinder when in the upright position, a maximum inclined position for the motor swash plate forming an angle with the axis of the motor cylinder, when inclined at an angle relative to the axis of the motor cylinder, the motor swash plate makes the motor plungers reciprocate for expansion and contraction strokes as the motor cylinder rotate.

8. The transmission according to claim 7, further comprising a motor swash plate holder which holds the motor swash plate, a pin projects from the nut screwed on the screw shaft, the pin engages a substantially U-shaped recess formed in the motor swash plate holder, the nut moves along the screw shaft according to rotation of the screw shaft to rotate the motor swash plate holder and the motor swash plate.

9. The transmission according to claim 1, wherein the hydraulic pump has a pump cylinder and the hydraulic motor has a motor cylinder, a working fluid being provided in the transmission and the transmission further comprising:

a cylinder block coaxially containing the pump cylinder of the hydraulic pump and the motor cylinder of the hydraulic motor, the cylinder block being provided with an annular inner passage and an annular outer passage coaxial with the annular inner passage; and a movable member included in a clutch valve for connecting and disconnecting the inner passage and the outer passage, the movable member being slidably fitted in the cylinder block and extending coaxially with the motor output shaft, the movable member being provided with;

a first check valve provided between a supply passage connected to a supply pump and formed in the casing and the inner passage, a second check valve provided between the supply passage and the outer passage, and a pressure regulating valve that opens when oil pressure within the outer passage increases beyond a fixed level for part of the working fluid to flow from the outer passage into the inner passage.

10. The transmission according to claim 9, wherein the movable member is a generally cylindrical spool slidably fitted in a through hole of the cylinder block.

11. The transmission according to claim 10, further comprising a ring fixed on an outer circumference of the cylinder block to define the annular outer passage, circumference of the through hole and the spool forming the annular inner passage, the inner and outer passages being concentric.

12. The transmission according to claim 1, wherein the hydraulic pump has a pump cylinder and the hydraulic motor has a motor cylinder, the transmission further comprising:

a neutral shift mechanism for engaging the output shaft and the reduction mechanism and for disengaging the output shaft and the reduction mechanism, the neutral shift mechanism being mounted on the output shaft of the transmission;

a cover and a second motor, the cover covering a generator connected to one end of the crankshaft projecting from the casing, the cover being attached to the casing supporting the crankshaft of the engine and containing the static, hydraulic continuously-variable-speed speed transmission mechanism, the second motor varying capacity of the hydraulic motor, the hydraulic motor being a variable displacement hydraulic motor and being covered with the cover;

a cylinder block coaxially containing the pump cylinder of the hydraulic pump and the motor cylinder of the hydraulic motor, the cylinder block being provided with an annular inner passage and an annular outer passage coaxial with the annular inner passage; and a movable member included in a clutch valve for connecting and disconnecting the inner passage and the outer passage, the movable member being slidably fitted in the cylinder block and extending coaxially with the motor output shaft.

13. The transmission according to claim 12, wherein the movable member includes:

a first check valve provided between a supply passage connected to a supply pump and formed in the casing and the inner passage;

a second check valve provided between the supply passage and the outer passage; and a pressure regulating valve that opens when oil pressure within the outer passage increases beyond a fixed level for part of a working fluid to flow from the outer passage into the inner passage.

14. A transmission for an engine having a crankshaft, a working fluid being provided in the transmission and the transmission comprising:

a static, hydraulic continuously-variable-speed transmission mechanism disposed with a longitudinal axis thereof generally parallel to the crankshaft, the hydraulic continuously-variable-speed transmission including a hydraulic pump connected to the crankshaft of the engine and a hydraulic motor having a motor output shaft coaxial with an axis of rotation of the hydraulic pump and connected to the hydraulic pump by a closed circuit, the hydraulic pump has a pump cylinder and the hydraulic motor has a motor cylinder;

a casing containing the static, hydraulic continuously-variable-speed transmission mechanism, an output shaft of the transmission being rotatably supported on the casing generally parallel to the longitudinal axis of the static, hydraulic continuously-variable-speed transmission mechanism;

a reduction gear mechanism for interconnecting the motor output shaft and the transmission output shaft;

a cylinder block coaxially containing the pump cylinder of the hydraulic pump and the motor cylinder of the hydraulic motor, the cylinder block being provided with an annular inner passage and an annular outer passage coaxial with the annular inner passage; and a movable member included in a clutch valve for connecting and disconnecting the inner passage and the outer passage, the movable member being slidably fitted in the cylinder block and extending coaxially with the motor output shaft, the movable member being provided with;

a first check valve provided between a supply passage connected to a supply pump and formed in the casing and the inner passage, a second check valve provided between the supply passage and the outer passage, and a pressure regulating valve that opens when oil pressure within the outer passage increases beyond a fixed level for part of the working fluid to flow from the outer passage into the inner passage.

15. The transmission according to claim 14, wherein the movable member is a generally cylindrical spool slidably fitted in a through hole of the cylinder block.

16. The transmission according to claim 15, further comprising a ring fixed on an outer circumference of the cylinder block to define the annular outer passage, circumference of the through hole and the spool forming the annular inner passage, the inner and outer passages being concentric.

17. A transmission for an engine having a crankshaft, the transmission comprising:

a static, hydraulic continuously-variable-speed transmission mechanism disposed with a longitudinal axis thereof generally parallel to the crankshaft, the hydraulic continuously-variable-speed transmission including a hydraulic pump connected to the crankshaft of the engine and a hydraulic motor having a motor output shaft coaxial with an axis of rotation of the hydraulic pump and connected to the hydraulic pump by a closed circuit, the hydraulic pump having a pump cylinder and the hydraulic motor having a motor cylinder;

a casing containing the static, hydraulic continuously-variable-speed transmission mechanism, an output shaft of the transmission being rotatably supported on the casing generally parallel to the longitudinal axis of the static, hydraulic continuously-variable-speed transmission mechanism;

a reduction gear mechanism for interconnecting the motor output shaft and the transmission output shaft;

a neutral shift mechanism for engaging the output shaft and the reduction mechanism and for disengaging the output shaft and the reduction mechanism, the neutral shift mechanism being mounted on the output shaft of the transmission;

a cover and a second motor, the cover covering a generator connected to one end of the crankshaft projecting from the casing, the cover being attached to the casing supporting the crankshaft of the engine and containing the static, hydraulic continuously-variable-speed transmission mechanism, the second motor varying capacity of the hydraulic motor, the hydraulic motor being a variable displacement hydraulic motor and being covered with the cover;

a cylinder block coaxially containing the pump cylinder of the hydraulic pump and the motor cylinder of the hydraulic motor, the cylinder block being provided with an annular inner passage and an annular outer passage coaxial with the annular inner passage; and a movable member included in a clutch valve for connecting and disconnecting the inner passage and the outer passage, the movable member being slidably fitted in the cylinder block and extending coaxially with the motor output shaft.

18. The transmission according to claim 17, wherein the movable member includes:

a first check valve provided between a supply passage connected to a supply pump and formed in the casing and the inner passage;

a second check valve provided between the supply passage and the outer passage; and a pressure regulating valve that opens when oil pressure within the outer passage increases beyond a fixed level for part of a working fluid to flow from the outer passage into the inner passage.

* * * * *